April 22, 1969   P. W. ERICKSON ET AL   3,440,120
METHOD OF FORMING A FILAMENT WOUND PLASTIC BODY
Original Filed Jan. 31, 1964
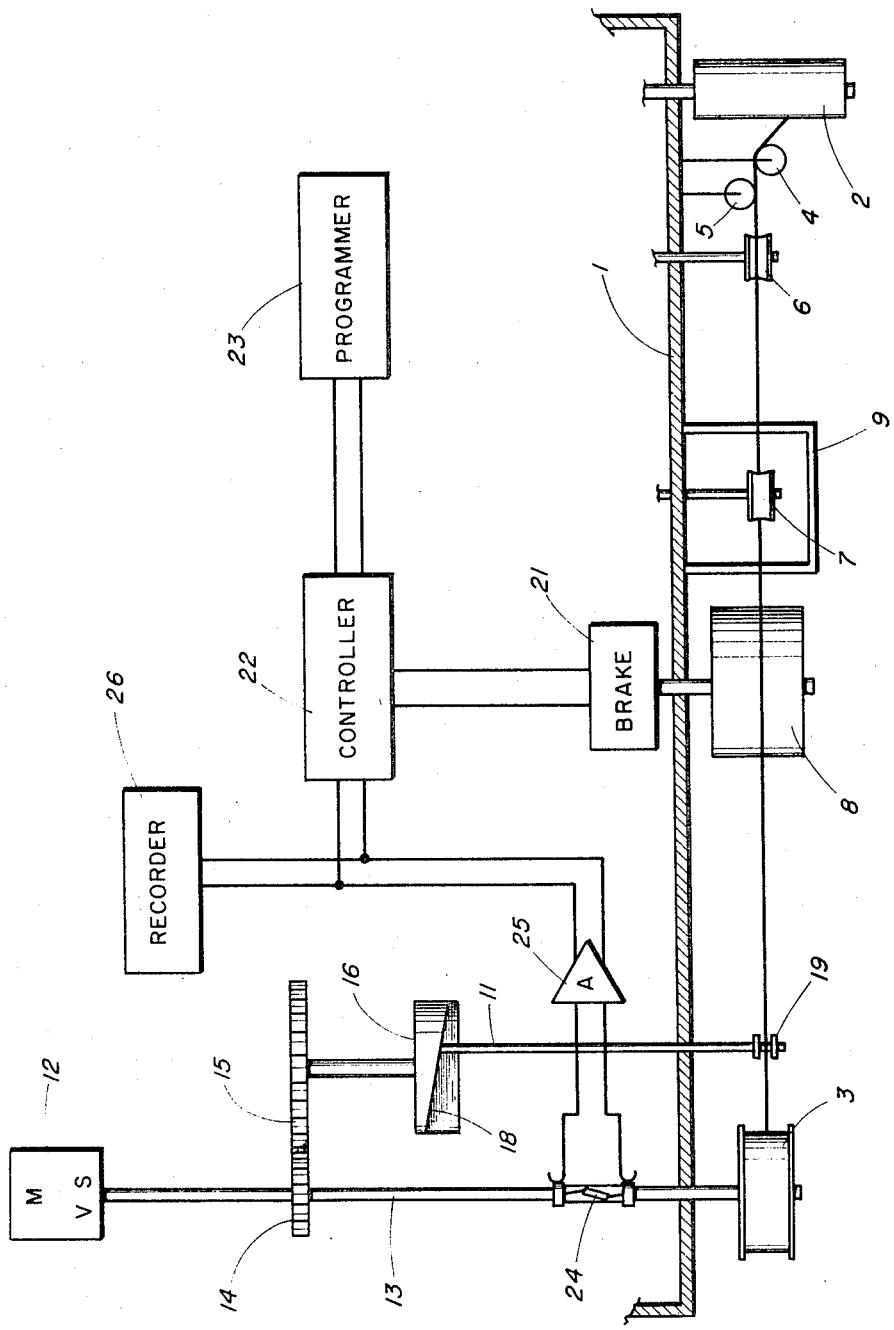
INVENTORS
Porter W. Erickson
Marlin A. Kinna United States Patent Office 3,440,120
Patented Apr. 22, 1969

3,440,120
METHOD OF FORMING A FILAMENT WOUND PLASTIC BODY
Porter W. Erickson and Marlin A. Kinna, Silver Spring, Md., assignors to the United States of America as represented by the Secretary of the Navy
Original application Jan. 31, 1964, Ser. No. 341,811, now Patent No. 3,276,705, dated Oct. 4, 1966. Divided and this application Apr. 19, 1965, Ser. No. 459,969
Int. Cl. B31c; B65h 77/00
U.S. Cl. 156—162                              1 Claim

ABSTRACT OF THE DISCLOSURE

A method for fabricating fiber reinforced hollow plastic casings in which a filament passing through a resin has tension imparted thereto by a braking mechanism in accordance with a preset electric signal from a programmer. The actual tension of the filament is thereafter measured and an electric signal representative thereof is compared with the preset signal. The difference between the signals is measured and the imparted tension is modified in accordance therewith.

---

The invention described herein may be manufactured and used by or for the Government of the United States of America for governmental purposes without the payment of any royalties thereon or therefor.

This application is a division of application Ser. No. 341,811, filed Jan. 31, 1964, now Patent No. 3,276,705.

The present invention relates to improvements in the field of filament reinforced hollow plastic casings, and more specifically to a new and improved method and apparatus for fabricating fiber reinforced hollow plastic casings which are capable of withstanding high internal pressures.

It is well known that the ability of a plastic casing to withstand internal pressures may be improved by providing filaments in or around the wall of the casing. The practice has been to wind the filament under a constant tension to thereby prestress the casing. It has been found, however, that a casing having a plurality of concentric layers of filament wound under a constant tension will not have a uniform tension distribution throughout the various layers after the entire casing has been formed. An analysis of such a casing has revealed the fact that the tension in the outer filament layers produces a relaxation or decrease in the tension originally present in the inner layers. Consequently, as a conventional casing expands radially under internal pressures and the outer layers are inherently elongated at a greater rate than the inner layers due to their greater distance from the axis of the casing, the outer layers of filament will reach their rupture point before the inner layers approach their breaking strength, thus failing to utilize the optimum strengths of all layers.

The present invention provides an improved winding method and apparatus as well as a new article of manufacture which overcomes the limitations of the prior art by selectively varying the tension of the filament during the fabrication of the article. When fabricating a fiber reinforced plastic case designed to withstand high internal pressures, for example, the fiber is applied under a high tension during the winding of the inner layers and the tension is gradually decreased as the thickness of the casing increases. The rate change of tension is chosen so that each layer of filament in the resultant casing will reach its breaking point at the same time as each of the other layers during the radial expansion of the casing, thus utilizing the full strength of the reinforcing fiber in each of the layers and producing an article having a high rupture strength.

An object of the present invention is the provision of a method of fabricating a filament reinforced plastic casing by varying the tension of the filament being wound upon a mandrel during the winding operation.

Another object is to provide a method of winding a filament upon a mandrel wherein the tension on the filament is selectively varied as a function of the thickness of the winding on the mandrel.

A further object of the invention is the provision of a winding method wherein a variable braking force is applied to a filament at a predetermined rate and the actual tension in the filament is measured and compared with the predetermined braking force to further monitor the tension in the filament.

Still another object of the invention is the provision of a winding machine which is capable of continuously varying the tension of a filament being wound during the winding procedure.

A still further object is the provision of a winding machine which applies a braking force to a filament at a predetermined rate during the winding thereof and measures the actual tension in the filament for comparison with the predetermined braking force to facilitate accurate monitoring of the tension in the filament.

Another object of the present invention is to provide a filament reinforced hollow plastic casing of great strength.

A further object is to provide a filament reinforced hollow plastic casing wherein various concentric layers of filament are prestressed to varying magnitudes.

Other objects, advantages, and novel features of the invention will become apparent, from the following detailed description of the invention when considered in conjunction with the accompanying drawings wherein:

The single figure shows a plan view of a winding machine incorporating the novel features of the present invention.

Referring to the drawings, there is shown a portion of a housing 1 upon which is rotatably mounted a spool 2 of glass fiber or other material for winding upon a mandrel 3. The strand is passed between guide rollers 4 and 5, over guide roller 6, under dip tank roller 7, over a tension drum 8, and onto the rotating mandrel. A dip tank 9 is filled with a resin, said resin being of either the B-staging type, including phenolics and silicones, or the wet-winding type, such as epoxies and polyesters, and is positioned to receive roller 7 so that a glass fiber or synthetic fiber strand is caused to pass through the resin and become impregnated with resin. The tension drum puts a restraining force on the strand as it is wound upon mandrel 3, while the winding is concentric helical layers of fiber upon the mandrel is guided by a fleeter arm 11. The resin impregnated concentric layers of glass fiber may then be cured to form a fiber reinforced plastic casing which may be removed from the mandrel.

Mandrel 3 is rotatably driven by a variable speed motor 12 by means of a drive shaft 13. Fixedly secured to the drive shaft is a first spur gear 14 for engagement with a second spur gear 15 which is mounted upon a shaft having a cam 16 secured to one end thereof. The fleeter arm 11 is resiliently biased toward the cam and positioned for abutting engagement with the cam surface 18 at one end and has a filament guide 19 attached to its other end. Rotation of cam 16 imparts a reciprocating longitudinal movement to fleeter arm 11 and guide 19, and the ratio of gears 14 and 15 is selected to control the reciprocation of the fleeter arm in a manner assuring uniform distribution of the filament across the mandrel width.

A conventional hysteresis brake 21 is mechanically coupled to tension drum 8 for selectively varying the amount of tension applied to the filament by the drum in accordance with an electrical signal received from a controller 22, which in turn is monitored by a preset signal derived from a programmer 23. Since the properties of a fiber reinforced plastic casing may be enhanced by selectively varying the tension in the filament during the winding procedure, programmer 23 is utilized to monitor the rate and direction of change of tension. The programmer may be any one of a number of well known programmers having a transducer therein for providing a variable electrical output signal proportional to the movement of a cam. The cam is cut in a predetermined manner to provide a desired variable output signal from the programmer which is then passed through controller 22 to the hysteresis brake 21 to control the brake and hence the tension in the filament as desired.

The device additionally includes a mechanism to insure that the actual tension set into the filament coincides with the intended or predetermined tension. To perform this function, a tension measuring means or transducer 24, such as a strain gauge, is secured to drive shaft 13 to sense the torque developed in the drive shaft as a function of the actual tension present in the filament. The signal from the strain gauge is sent to an amplifier 25 and then to controller 22, where the torque responsive signal is then electrically compared with the preset signal which is received by the controller from programmer 23. If the actual tension present in the filament is either higher or lower than the desired tension, this condition will be detected by the controller, which then acts to monitor the signal sent from the controller to the hysteresis brake until the actual tension coincides with the instantaneous cam-set tension. Therefore, it may be seen that controller 22 varies the effectiveness of hysteresis brake 21 in accordance with the preset signal received from programmer 23 to develop a predetermined variable tension into the filament and further modifies the effectiveness of the hysteresis brake if the signal received from transducer 24, which is representative of the actual tension present in the filament, does not equal the signal received from the programmer. When desired, a recorder 26 is electrically connected to the output from transducer 24 and amplifier 25 for recording the actual tension applied to the filament by the tension drum 8 throughout the winding operation.

It is apparent that the present invention makes possible the variation and monitoring of the tension in a filament during the winding of a casing and facilitates the same tension control during the winding of consecutive casings. The rate of change of tension may be selectively controlled by the use of different cams in the programmer 23. Similarly, the cams may be cut to have contours which will cause decreases and/or increases in tension during the winding process, or any combination thereof, as desired. A cam is cut to a configuration which will produce the desired rate of change tension in the filament during the winding operation, which configuration is determined from the rotational speeds of the mandrel and cam as well as from the duration of the winding operation and the rate of change of tension which is to be produced.

Obviously many modifications and variations of the present invention are possible in the light of the above teachings. It is therefore to be understood that within the scope of the appended claim the invention may be practiced otherwise than as specifically understood.

What is claimed is:

1. A method of forming a filament reinforced plastic body comprising the steps of:

passing a filament through a resin and onto a rotating mandrel;

applying a preset electrical signal from a programmer to a braking mechanism to impart tension to said filament during the winding thereof onto said mandrel;

measuring the actual tension in said filament during the winding operation and providing an electrical signal representative thereof;

measuring any differences between the electrical signal representative of the actual tension and the electrical signal from the programmer, modifying the signal to said braking mechanism in accordance with the measured difference to change the tension on said filament and eliminate the measured difference; and curing said body.

References Cited

UNITED STATES PATENTS

| 3,047,247 | 7/1962 | Kotte | 242—45 |
| 3,112,897 | 12/1963 | Eshbaugh et al. | 242—45 |
| 3,141,624 | 7/1964 | Gentle et al. | 242—45 XR |
| 3,032,245 | 5/1962 | George et al. | 242—75.2 XR |
| 2,731,376 | 1/1956 | Rusch | 156—175 |

PHILIP DIER, *Primary Examiner.*

U.S. Cl. X.R.

156—175, 378, 446